United States Patent
Das et al.

(10) Patent No.: US 11,461,368 B2
(45) Date of Patent: Oct. 4, 2022

(54) RECOMMENDING ANALYTIC TASKS BASED ON SIMILARITY OF DATASETS

(71) Applicant: ENTIT Software LLC, Sunnyvale, CA (US)

(72) Inventors: Mahashweta Das, Palo Alto, CA (US); Mehmet Kivanc Ozonat, Palo Alto, CA (US)

(73) Assignee: Micro Focus LLC, Santa Clara, CA (US)

( * ) Notice: Subject to any disclaimer, the term of this patent is extended or adjusted under 35 U.S.C. 154(b) by 589 days.

(21) Appl. No.: 15/580,430

(22) PCT Filed: Jun. 23, 2015

(86) PCT No.: PCT/US2015/037206
§ 371 (c)(1),
(2) Date: Dec. 7, 2017

(87) PCT Pub. No.: WO2016/209213
PCT Pub. Date: Dec. 29, 2016

(65) Prior Publication Data
US 2018/0181641 A1 Jun. 28, 2018

(51) Int. Cl.
*G06F 16/28* (2019.01)
*G06N 20/00* (2019.01)
(Continued)

(52) U.S. Cl.
CPC .......... *G06F 16/285* (2019.01); *G06F 9/4881* (2013.01); *G06F 16/245* (2019.01);
(Continued)

(58) Field of Classification Search
CPC .... G06F 16/285; G06F 16/245; G06F 9/4881; G06K 9/6218; G06K 9/6227; G06K 9/6215; G06N 20/00
See application file for complete search history.

(56) References Cited

U.S. PATENT DOCUMENTS 8,538,934 B2   9/2013   Hudis et al.
8,706,758 B2   4/2014   Chew
(Continued)

FOREIGN PATENT DOCUMENTS

WO   WO-2013085709   6/2013
WO   WO-2014100290   6/2014

OTHER PUBLICATIONS

McCallum, A. et al.; "Efficient Clustering of High-dimensional Data Sets with Application to Reference Matching"; Jun. 6, 2000; 10 pages.

(Continued)

*Primary Examiner* — William B Partridge
*Assistant Examiner* — Aryan D Toughiry
(74) *Attorney, Agent, or Firm* — Sheridan Ross P.C.

(57) ABSTRACT

Recommending analytic tasks based on similarity of datasets is disclosed. One example is a system including a data processor, a matching module, and a recommendation module. The data processor receives an incoming dataset via a processing system, and generates a feature vector for the incoming dataset. The matching module determines similarity measures between the generated feature vector and representative feature vectors for a plurality of datasets in a data repository, and selects at least one dataset of the plurality of datasets based on the similarity measures. The recommendation module identifies at least one analytic task associated with the selected dataset, and recommends, to a computing device via the processing system, the at least one analytic task to be performed on the incoming dataset.

20 Claims, 3 Drawing Sheets

(51) Int. Cl.
*G06F 16/245* (2019.01)
*G06K 9/62* (2022.01)
*G06F 9/48* (2006.01)

(52) U.S. Cl.
CPC ......... *G06K 9/6215* (2013.01); *G06K 9/6218* (2013.01); *G06K 9/6227* (2013.01); *G06N 20/00* (2019.01)

(56) References Cited

U.S. PATENT DOCUMENTS

| | | | |
|---|---|---|---|
| 2005/0278324 A1 | 12/2005 | Fan et al. | |
| 2008/0162580 A1 | 7/2008 | Harush | |
| 2010/0169385 A1 | 7/2010 | Rubinoff | |
| 2010/0281025 A1 | 11/2010 | Tsatsou et al. | |
| 2012/0296701 A1 | 11/2012 | Brieter | |
| 2013/0111484 A1* | 5/2013 | Chen | G06F 11/0757 718/102 |
| 2013/0111488 A1* | 5/2013 | Gatti | G06N 20/00 718/103 |
| 2013/0262349 A1* | 10/2013 | Bouqata | G06N 20/00 706/12 |
| 2014/0006338 A1 | 1/2014 | Watson et al. | |
| 2014/0122486 A1* | 5/2014 | Simard | G06F 3/0482 707/737 |
| 2014/0270494 A1 | 9/2014 | Sawhney et al. | |
| 2015/0120639 A1* | 4/2015 | Shin | G06K 9/6221 706/52 |
| 2015/0269242 A1* | 9/2015 | Dey | H04L 51/16 707/737 |
| 2015/0356085 A1* | 12/2015 | Panda | G06N 5/04 707/748 |
| 2016/0180479 A1* | 6/2016 | Khanzode | G06F 16/355 705/311 |
| 2016/0335260 A1* | 11/2016 | Convertino | G06F 16/2358 |

OTHER PUBLICATIONS

International Searching Authority., International Search Report and Written Opinion dated Mar. 21, 2016 for PCT Application No. PCT/US2015/037206 Filed Jun. 23, 2015, 10 pgs.

* cited by examiner

RECOMMENDING ANALYTIC TASKS BASED ON SIMILARITY OF DATASETS

BACKGROUND

A variety of analytic tasks may be performed on datasets. Similar datasets may be generally amenable to similar analytic tasks.

DETAILED DESCRIPTION

Figure 1:
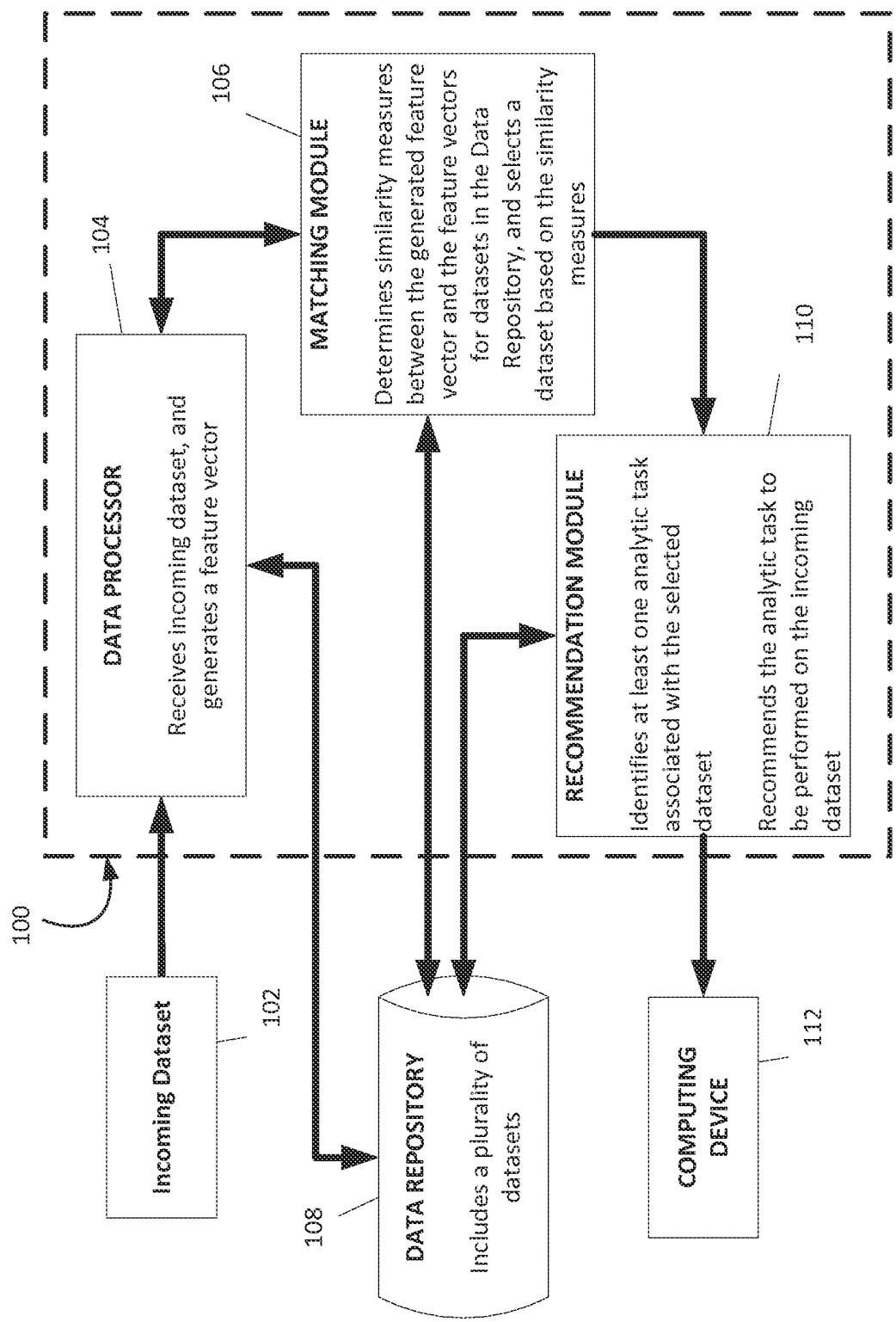
FIG. 1 is a functional block diagram illustrating one example of a system for recommending analytic tasks based on similarity of datasets.

Big data analytics have enabled data scientists to unlock strategic insights from vast troves of data by employing statistics, computer science, and engineering knowledge. Business analysts, domain experts, scientists like ornithologists, botanists, and so forth, routinely utilize data science toolkits. However, such data science toolkits are not generally equipped to recommend which technique to employ on a given dataset to maximize a return on information. For example, a financial analyst may not know whether to employ regression analysis or a classification algorithm to make stock market predictions. While an optimal choice may be dependent on a variety of factors such as user's objective, application domain, size and type of data, input of the algorithm, etc., the present disclosure provides preliminary guidance to such users.

Some existing technologies generally integrate heterogeneous geospatial data sources by determining semantic similarity between geospatial data sources that may typically involve matching attributes and attribute values between tables using a semantic similarity measure. Such techniques are generally limited to handling geographic data sources having geographic instance properties, and may not account for data characteristics like distribution, topic, content, and application domain. Other existing methods match datasets with similar content but that are at different resolutions. Such an approach is generally limited to geographical datasets, and uses similarity measures based on topology, geometry, and semantics. Clustering techniques are generally limited to data elements within a specific dataset, as opposed to a clustering of datasets.

As disclosed herein, a repository of datasets may be partitioned based on data characteristics such as data type, size, distribution, attributes, topic, content, and application domain. When a new dataset is received, it may be matched to one or more of existing datasets in the repository. Algorithms that are known to have successfully analyzed such datasets (for example, based on historical log information) may be recommended for the new dataset. Consequently, users may rapidly conduct big data analytics in an analytics platform without having to analyze and/or apply the underlying technical and mathematical details of the analytics tasks.

For example, a data repository may include a group A of structured spatio-temporal earth science datasets such as: (i) World Daily Air Temperature from 2001-2010 by Latitude-Longitude, (ii) US Monthly Precipitation from 1901-2000 by Zipcode, and (iii) California Forest Fire from 1991-2010 by Region. The data repository may also include another group B of time-series datasets such as: (iv) New York Stock Exchange daily closing price from 1951-2000, (v) Euro daily foreign exchange rate from 2001-2014, and (vi) US Bank real estate monthly loan from 1971-2000. A new dataset may be received, where the dataset relates to data on El Nino in the Pacific between 1980 and 1990. The new dataset may be matched to one or more datasets in group A because of spatio-temporal data type, earth science topic, and seasonal pattern in data distribution. Analytics tasks performed on the datasets in group A may be identified. For example, tasks such as predicting the temperature, precipitation, forest fire of a location at a future timestamp, and so forth may be identified. Based on a similarity comparison, it may be determined that such tasks may be applicable to the dataset related to El Nino data as well. Also, for example, the size, i.e., the number of instances and the number of attributes of the datasets, may be a good indicator of which learning algorithm may be employed on the El Nino dataset. Accordingly, analytics tasks and machine learning algorithms may be automatically recommended to a user, such as, for example, a geoscientist, who may want to extract meaningful patterns from the El Nino data.

As described in various examples herein, a recommendation system based on a similarity of datasets is disclosed. One example is a system including a data processor, a matching module, and a recommendation module. The data processor receives an incoming dataset via a processing system, and generates a feature vector for the incoming dataset. The matching module determines similarity measures between the generated feature vector and representative feature vectors for a plurality of datasets in a data repository, and selects at least one dataset of the plurality of datasets based on the similarity measures. The recommendation module identifies at least one analytic task associated with the selected dataset, and recommends, to a computing device via the processing system, the at least one analytic task to be performed on the incoming dataset.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for recommending analytic tasks based on similarity of datasets. System 100 includes a data processor 104, a matching module 106, and a recommendation module 110. The data processor 104 may receive an incoming dataset 102 via a processing system. In some examples, the data processor 104 may be communicatively linked to a source of data. For example, data processor 104 may receive incoming dataset 102 that is input via a computing device. Also, for example, data processor 104 may receive incoming dataset 102 from a publicly available source such as a weather data center, a nutrition database, a scientific database, and so forth. The received incoming dataset 102 may include information related to weather, food, drugs, natural phenomena, health, and so forth. For example, the received incoming dataset 102 may include weather data related to El Nino.

The term "dataset", as used herein, generally refers to a collection of data. Generally, the dataset may be in structured form. For example, the dataset may be a linked database, a tabular array, a matrix, an excel worksheet, and so forth. In some examples, the dataset may be unstructured, and may be converted to a structured dataset. In some examples, the dataset may be in semi-structured form. For example, the dataset may be a collection of log messages, snippets from text messages, messages from social networking platforms, and so forth. The term "data elements" as used herein generally refers to any data included in a dataset. For example, the dataset may be a matrix, and the data elements may be rows or columns of the matrix. Likewise, the dataset may be a collection of vectors, and the data elements may be the individual vectors.

In some examples, the data elements may also be any metadata related to a dataset. For example, the data elements may be timestamp data related to log messages in a collection of log messages. As another example, the dataset may be a matrix, and the data elements may be high-dimensional vectors representative of weather-related data. In some examples, the dataset may be a stream of data, and the data elements may be data in the stream of data. For example, the dataset may be a stream of real-time data from a live traffic database. Generally, data elements may be in a variety of different data formats. For example, the data may be textual data, including numeric and/or non-numeric data, video data, image data, audio data, and/or data in mixed format.

In some examples, the data processor 104 may generate a feature vector for the incoming dataset 102. Generally, a feature vector for a dataset is representative of salient features of an entire dataset. The feature vector for a dataset is different from a feature vector for a data element. For example, if the data set is represented in matrix form, the feature vector of the matrix may be a vector with components representative of features of the matrix. On the other hand, a feature vector for a data element in the matrix may be a feature vector for a given column in the matrix.

In some examples, the feature vector of the matrix may be a vector with components including features such as, topic, data type, a number of column groups, a column group header, a column group type, data characteristic, data distribution, a number of rows, a number of columns, and so forth. In some examples, the topic may be earth science, finance, nutrition, and so forth. In some examples, the data type may be multivariate or univariate. In some examples, each column group may be associated with a column group header such as, for example, time, location, temperature values, stock price values, forest fire values, and so forth. In some examples, each column group may be associated with a column group data type such as, for example, discrete, continuous, integer, binary, and so forth. In some examples, the data characteristic may be spatio-temporal, spatial, temporal, and so forth. In some examples, the data distribution may be a probability distribution for the data, including, for example, distributions such as normal, pareto, Gaussian, hypergeometric, and so forth.

TABLE 1

Example Feature Vectors for Example Datasets

| | Feature Vector for a dataset for World Daily Air Temperature from 2001-2010 by Latitude-Longitude | Feature Vector for a dataset for US Monthly Precipitation from 1901-2000 by Zipcode | Feature Vector for a dataset for California Forest Fire from 1991-2010 by Region | Feature Vector for a dataset for New York Stock Exchange daily closing price from 1951-2000 |
|---|---|---|---|---|
| Topic | Earth Science | Earth Science | Earth Science | Finance |
| Data Type | Multivariate | Multivariate | Multivariate | Univariate |
| No. of column groups | 3 | 3 | 2 | 2 |
| Column 1 Group Header | Time | Time | Time | Time |
| Column 1 Group Data Type | Discrete | Discrete | Discrete | Discrete |
| Column 2 Group Header | Location | Location | Forest Fire Values | Stock Values |
| Column 2 Group Data Type | Discrete | Discrete | Continuous | Integer |
| Column 3 Group Header | Temperature Values | Precipitation Values | | |
| Column 2 Group Data Type | Continuous | Continuous | | |
| Data Characteristic | Spatio-temporal | Spatio-temporal | Temporal | Temporal |
| Data Distribution | Normal | Normal | Normal | Pareto |
| No. of Rows | 3 | 3 | 3 | 2 |
| No. of columns | 650000 | 40000 | 1000 | 100000000 |

Table 1 illustrates example feature vectors for example datasets. For example, the dataset may be related to World Daily Air Temperature from 2001-2010 by Latitude-Longitude. Accordingly, an example feature vector and/or representative feature vector may be generated as illustrated in the second column in Table 1. For example the feature vector may be <earth science, multivariate, 3, time, discrete, location, discrete, temperature values, continuous, spatio-temporal, normal, 3, 650000>.

As another example, the dataset may be related to US Monthly Precipitation from 1901-2000 by Zipcode. Accordingly, an example feature vector and/or representative feature vector may be generated as illustrated in the third column in Table 1. For example the feature vector may be <earth science, multivariate, 3, time, discrete, location, discrete, precipitation values, continuous, spatio-temporal, normal, 3, 40000>.

Also, for example, the dataset may be related to California Forest Fire from 1991-2010 by Region. Accordingly, an example feature vector and/or representative feature vector may be generated as illustrated in the fourth column in Table 1. For example the feature vector may be <earth science, multivariate, 2, time, discrete, forest fire values, continuous, temporal, normal, 3, 1000>.

As another example, the dataset may be related to New York Stock Exchange daily closing price from 1951-2000. Accordingly, an example feature vector and/or representative feature vector may be generated as illustrated in the fifth column in Table 1. For example the feature vector may be <finance, univariate, 2, time, discrete, stock values, integer, temporal, pareto, 2, 100000000>.

In some examples, the data processor 104 may preprocess a given dataset of the plurality of datasets in the data repository 108 based on information theory concepts to group similar data elements in the given dataset. In some examples, the data processor 104 may employ such data pre-processing techniques to group similar columns in a dataset together and/or to reduce clutter. For example, the data processor 104 may compute mutual information for pairs of columns in a matrix representation of a dataset. The data processor 104 may group columns that have a high mutual information.

In some examples, the data processor 104 may apply one of text mining and natural language processing to extract properties of the datasets to generate representative features of datasets in the data repository 108. In some examples, the data processor 104 may associate a dataset in the data repository 108 with a feature vector representation based on techniques described herein. Table 1 illustrates example representative feature vectors for example datasets.

In some examples, datasets may be clustered based on similar column data types. For example, for 'spatio-temporal' type, there may be at least one column for time, and at least one column for location, and at least one column for numeric, categorical, and/or Boolean values. In some examples, datasets may be clustered based on similar column value distributions. For example, a dataset on yearly temperature and yearly precipitation may exhibit seasonal patterns that may be captured via similar data distributions. In some examples, datasets may be clustered based on similar data size. For example, datasets with the same number of rows and/or columns may be clustered together.

In some examples, the data processor 104 may apply such clustering techniques sequentially. For example, the datasets may be first clustered based on a general topic of content, followed by a clustering based on concepts in column headers, followed by a clustering based on taxonomy terms in column headers, followed by a clustering based on data distributions of columns, followed by a clustering based on data types, and followed by a clustering based on data size.

In some examples, the data processor 104 may process the data objects and generate structured data from unstructured data. For example, the data processor 104 may receive a collection of log messages, extract information including timestamp data, source data, keywords and/or key phrases, n-grams, video clips, audio clips, etc. from the collection, and generate a structured data set, for example, a matrix that includes such extracted information.

In some examples, the data processor 104 may apply one of text mining and natural language processing to extract properties of the datasets to generate representative features of datasets in the data repository 108. In some examples, the data processor 104 may associate a dataset in the data repository 108 with a feature vector representation.

The matching module 106 may determine similarity measures between the generated feature vector and representative feature vectors for a plurality of datasets in the data repository 108. The similarity measure for a pair of vectors is a measure of a degree of similarity of the two vectors. In some examples, the similarity measure may be a comparison of a number of overlaps between components of the vectors. In some examples, the similarity measure may be a semantic comparison of components of the two vectors. In some examples, the similarity measures may be based on at least one of data type, data size, data distribution, data attributes, topic, content, and application domain.

In some examples, the data processor 104 may be communicatively linked to the data repository 108 and/or to the matching module 106. In some examples, the data processor 104 may cluster the plurality of datasets in the data repository 108 based on the similarity measure. In some examples, datasets may be clustered based on a similar general topic of content. For example, datasets related to earth sciences may be clustered together. In some examples, datasets may be clustered based on similar column header topics. For example, for topic 'time', column headers may be year, month, etc, and datasets may be clustered based on similar years (and/or range of years). Also, for example, for topic 'location', column headers may be zip code, city name, etc., and datasets may be clustered based on similar zip code, city name, etc. In some examples, the data processor 104 may associate a cluster of datasets in the data repository 108 with a feature vector representation.

In some examples, the matching module 106 may select at least one dataset of the plurality of datasets based on the similarity measures. In some examples, the matching module 106 may select at least one cluster of datasets based on similarity measures between the generated feature vector and the representative feature vectors. For example, as described herein, the data processor 104 may provide a feature vector representation for the incoming dataset 102 to the matching module 106. Also, for example, the data processor 104 may provide feature vector representations for clusters of datasets in the data repository 108 to the matching module 106. In some examples, the matching module 106 may retrieve the feature vector representations for datasets from the data repository 108.

In some examples, the matching module 106 may perform a course-grained matching by comparing the feature vector representation for the incoming dataset 102 with the feature vector representations for clusters of datasets and/or feature vector representations for datasets in a cluster, to select the at least one cluster based on similarity measures.

In some examples, the matching module 106 may select the at least one dataset from the selected at least one duster based on the similarity measures between the generated feature vector and the representative feature vectors of datasets in the selected at least one cluster. For example, after a course-grained matching identifies the at least one cluster, the matching module 106 may apply a fine-grained matching based on a comparison of the feature vector representation for the incoming dataset 102 with the feature vector representations for datasets in the selected at least one cluster. Accordingly, whereas the course-grained matching identifies a group of similar datasets in the data repository 108, the fine-grained matching identifies a similar dataset within the identified group.

In some examples, based on data attributes, the course-grained matching may be sufficient to identify the at least one dataset similar to the incoming dataset 102. Accordingly, a fine-grained matching may not be performed. For example, the data repository 108 may include datasets related to spatio-temporal earth sciences data. Data attributes may include location, latitude, longitude, zipcode, timestamp, and so forth. The incoming dataset 102 may include soil moisture data for various locations in the United States. Based on the techniques described herein, a course-grained similarity match based on a numerical comparison may be performed to identify a cluster of datasets that include data related to temperature, rainfall, and humidity for various locations in the United States. Accordingly, a course-grained matching may be sufficient for the incoming soil data. In some examples, based on data attributes, the course-grained matching may be identical to the fine-grained matching.

However, in some examples, the incoming dataset 102 may include more categorical data such as country name, city name, region, type of vegetation, etc. In such a situation, the course-grained matching based on numerical data may not be sufficient, and a fine-grained matching may be needed to account for the categorical data. For example, the data related to zip codes may have been used as a numerical data in the course-grained matching. However, the categorical nature of the incoming dataset 102 may suggest that the data related to zip codes may be utilized as a categorical data. In some examples, semantic comparisons may be performed for such categorical data.

In some examples, the recommendation module 110 may identify at least one analytic task associated with the selected dataset. For example, the recommendation module 110 may be communicatively linked to the data repository 108. In addition to the plurality of datasets, the data repository 108 may also include data related to analytic tasks performed on the datasets. For example, the data repository 108 may be a linked database where a dataset may be linked to an analytic task that has been performed on the dataset.

For example, a first dataset may relate to financial data, and the data repository 108 may also include a link to a regression analysis technique associated with the first dataset. Also, for example, a second dataset may include census data related to housing and education, based on age, gender, house value, population data, number of cars, and so forth, and the data repository 108 may include a link to analytic tasks performed on the second dataset. For example, the link may indicate that regression analyses have been performed on the second dataset based on house value with respect to a number of residents, house value with respect to local climate, house value with respect to a level of education of the owner, and so forth.

In some examples, the at least one analytic task may include one of a machine learning algorithm and an analytics algorithm. The machine learning algorithm may be supervised learning, unsupervised learning, and/or semi-supervised learning. For example, a dataset may include image data for a plurality of human faces, and a machine learning algorithm may have been employed to extract one or more features associated with the dataset. The analytics algorithm may be any algorithm that analyzes a given dataset. For example, the analytics algorithm may be a pattern processing algorithm, an anomaly detection algorithm, and so forth.

In some examples, the recommendation module 110 may recommend, to a computing device 112 via the processing system, the at least one analytic task to be performed on the incoming dataset 102. For example, the incoming dataset 102 may be new census data. Based on the techniques described herein, the matching module may identify that the new census data is similar to the second dataset described herein. Accordingly, the recommendation module 110 may recommend that a regression analysis may be performed on the new census data. For example, the recommendation module 110 may recommend that a regression analysis may be performed on the new census data for education with respect to a number of cars in the household.

In some examples, the recommendation module 110 may recommend the at least one analytic task based on log information. Log information may generally be log data related to analytic tasks that may be performed on datasets. In some examples, the log information may be historical log information. As described herein, such log data may be stored via a link in a linked database, and associated with a dataset in the data repository 108. In some examples, log information may be extracted from a cloud-based analytics platform system. In some examples, log information may be extracted from a stack overflow.

In some examples, the recommendation module 110 may recommend an analytic task that may be inferred from analytic tasks that were performed in the past. For example, the recommendation module 110 may recommend an analytic task that may be inferred from historical log information. For example, if past analyses on the second dataset included regression analyses for education cost with respect to local temperature, then the recommendation module 110 may recommend that a regression analysis be performed on the new census data based on housing value with respect to local temperature.

In some examples, the recommendation module 110 may provide the at least one analytic task to a computing device via an interactive graphical user interface. For example, the recommendation module 110 may provide a message indicative of the analytic task to be performed. In some examples, the recommendation module 110 may provide a selectable icon to accept and/or reject the recommended analytic task. For example, a user may identify that the recommended analytic task is not appropriate for the incoming dataset 102, and may reject the recommended analytic task. In some examples, another recommended analytic task may be provided to the user.

In some examples, the recommendation module 110 may store an association between the at least one analytic task and the selected dataset in the data repository 108. Such a stored association may be utilized later to recommend analytic tasks to additional incoming datasets.

The components of system 100 may be computing resources, each including a suitable combination of a physical computing device, a virtual computing device, a network, software, a cloud infrastructure, a hybrid cloud infrastructure that may include a first cloud infrastructure and a second cloud infrastructure that is different from the first cloud infrastructure, and so forth. The components of system 100 may be a combination of hardware and programming for performing a designated visualization function. In some instances, each component may include a processor and a memory, while programming code is stored on that memory and executable by a processor to perform a designated function.

For example, the matching module 106 may be a combination of hardware and programming to match the incoming dataset 102 to similar datasets of the plurality of datasets. Also, for example, the matching module 106 may include software programming to determine similarity measures. The matching module 106 may include hardware to physically store, for example, such determined quantities, and/or maintain a dynamically updated database that stores the similarity measures.

Likewise, the recommendation module 110 may be a combination of hardware and programming to identify and recommend analytic tasks. Also, for example, the recommendation module 110 may include programming to provide the recommended analytic task to a computing device. The recommendation module 110 may include hardware to physically store, for example, an association of the incoming dataset 102 with a recommended analytic task. Also, for example, the recommendation module 110 may include software programming to dynamically interact with the other components of system 100.

Generally, the components of system 100 may include programming and/or physical networks to be communicatively linked to other components of system 100. In some instances, the components of system 100 may include a processor and a memory, while programming code is stored and on that memory and executable by a processor to perform designated functions.

A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 2:
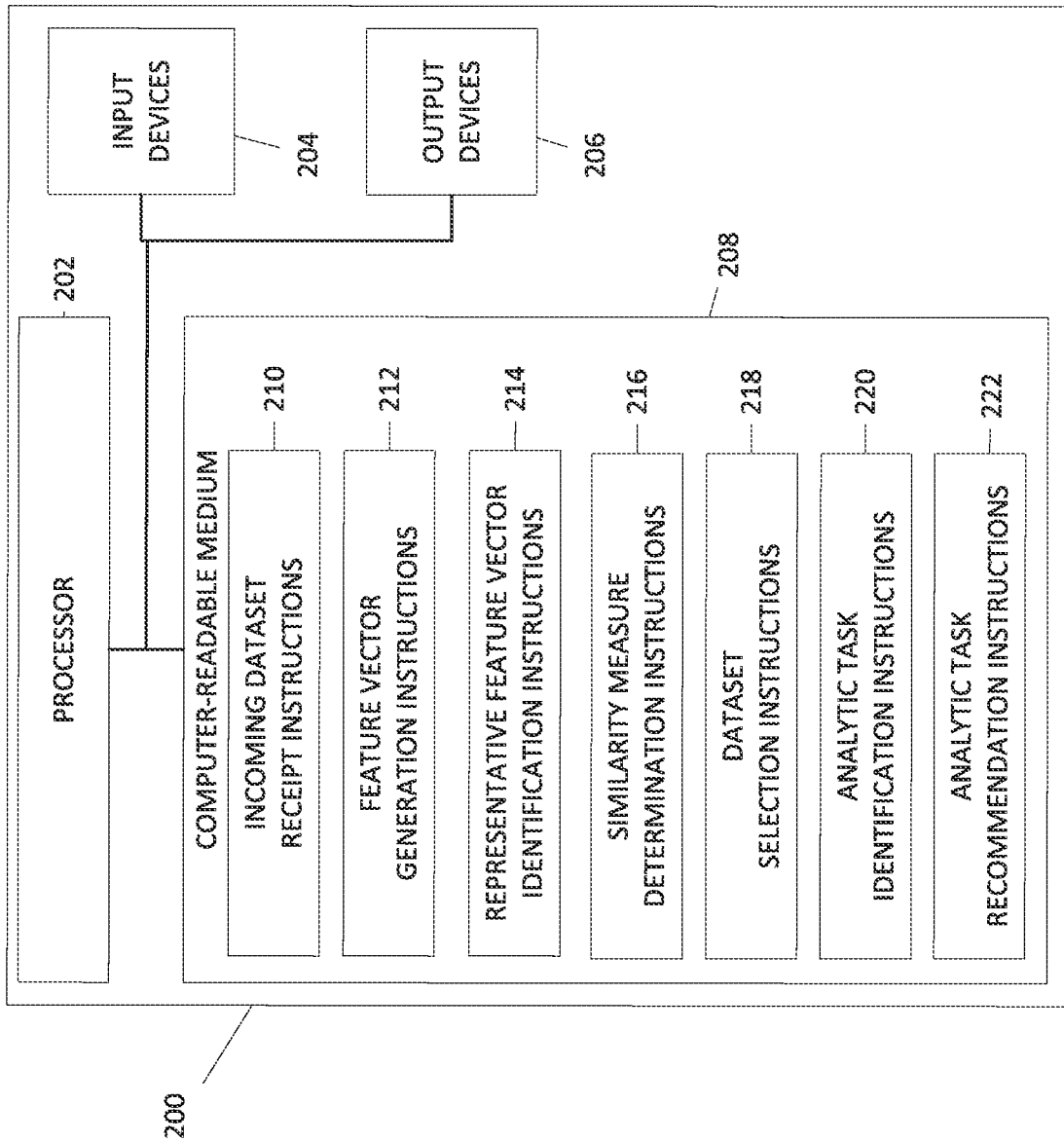
FIG. 2 is a block diagram illustrating one example of a computer readable medium for recommending analytic tasks based on similarity of datasets.

FIG. 2 is a block diagram illustrating one example of a computer readable medium for recommending analytic tasks based on similarity of datasets. Processing system 200 includes a processor 202, a computer readable medium 208, input devices 204, and output devices 206. Processor 202, computer readable medium 208, input devices 204, and output devices 206 are coupled to each other through a communication link (e.g., a bus).

Processor 202 executes instructions included in the computer readable medium 208. Computer readable medium 208 includes incoming dataset receipt instructions 210 to receive an incoming dataset via the processor 202.

Computer readable medium 208 includes feature vector generation instructions 212 to generate a feature vector for the incoming dataset.

Computer readable medium 208 includes representative feature vector identification instructions 214 to match, via the processor 202, representative feature vectors for a plurality of datasets in a data repository.

Computer readable medium 208 includes similarity measure determination instructions 216 to determine, via the processor 202, similarity measures between the generated feature vector and the representative feature vectors for the plurality of datasets.

Computer readable medium 208 includes dataset selection instructions 218 to select at least one dataset of the plurality of datasets based on the similarity measures.

Computer readable medium 208 includes analytic task identification instructions 220 to identify, via the processor 202, at least one analytic task associated with the selected dataset, wherein the at least one analytic task includes one of a machine learning algorithm and an analytics algorithm.

Computer readable medium 208 includes analytic task recommendation instructions 222 to recommend, to a computing device via the processor 202, the at least one analytic task to be performed on the incoming dataset.

In some examples, the similarity measure determination instructions 216 include instructions to determine the similarity measures based on a comparison of at least one of data type, data size, data distribution, data attributes, topic, content, and application domain.

Input devices 204 include a keyboard, mouse, data ports, and/or other suitable devices for inputting information into processing system 200. In some examples, input devices 204, such as a computing device, are used to receive the incoming dataset. Output devices 206 include a monitor, speakers, data ports, and/or other suitable devices for outputting information from processing system 200. In some examples, output devices 206 are used to recommend the at least one analytic task to be performed on the incoming dataset.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 208 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 200 are identified and refer to a combination of hardware and programming configured to perform a designated visualization function. As illustrated in FIG. 2, the programming may be processor executable instructions stored on tangible computer readable medium 208, and the hardware may include processor 202 for executing those instructions. Thus, computer readable medium 208 may store program instructions that, when executed by processor 202, implement the various components of the processing system 200.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 208 may be any of a number of memory components capable of storing instructions that can be executed by Processor 202. Computer readable medium 208 may be non-transitory in the sense that it does not encompass a transitory signal but instead is made up of one or more memory components configured to store the relevant instructions. Computer readable medium 208 may be implemented in a single device or distributed across devices. Likewise, processor 202 represents any number of processors capable of executing instructions stored by computer readable medium 208. Processor 202 may be integrated in a single device or distributed across devices. Further, computer readable medium 208 may be fully or partially integrated in the same device as processor 202 (as illustrated), or it may be separate but accessible to that device and processor 202. In some examples, computer readable medium 208 may be a machine-readable storage medium.

Figure 3:
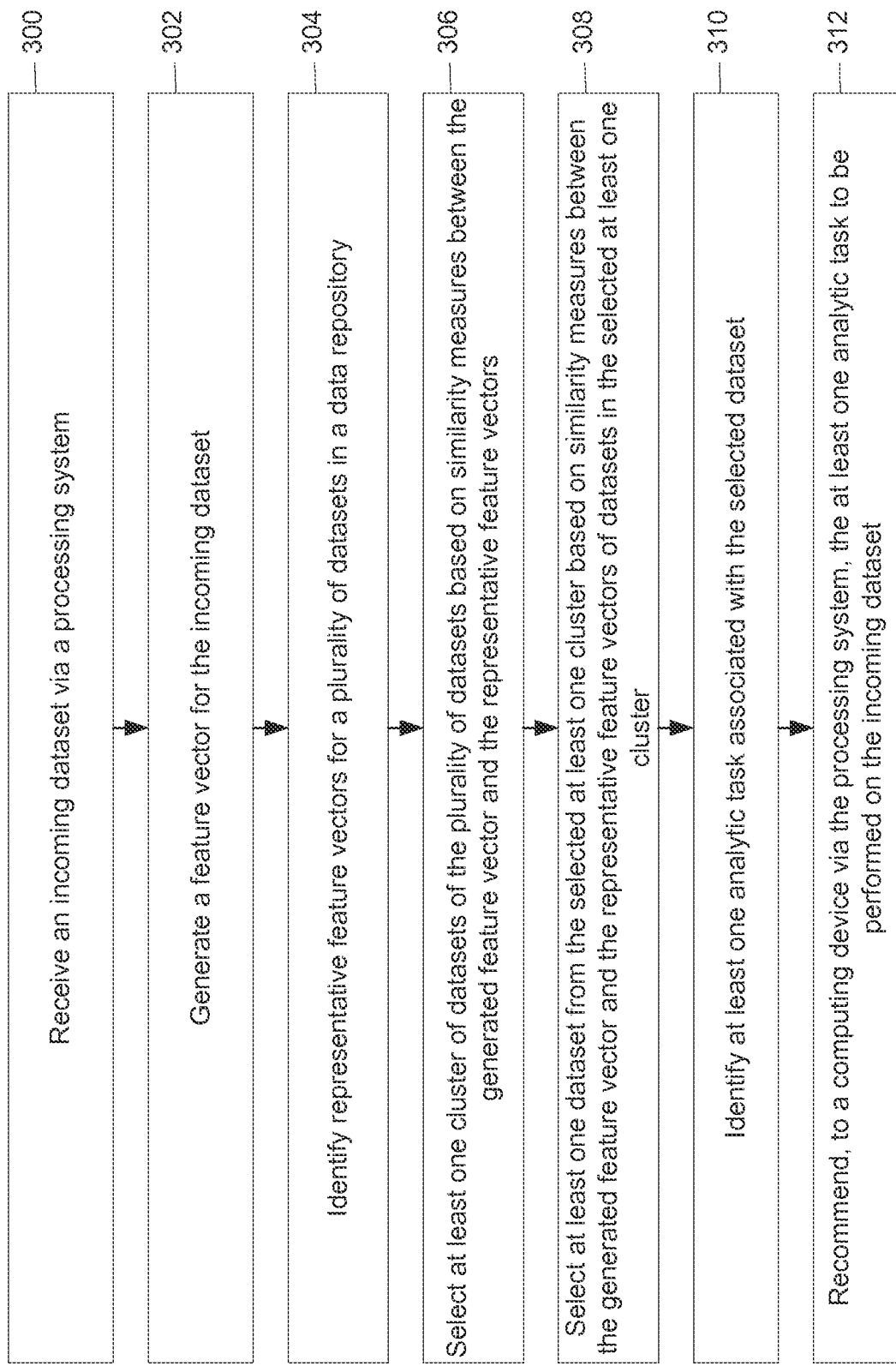
FIG. 3 is a flow diagram illustrating one example of a method for recommending analytic tasks based on similarity of datasets.

FIG. 3 is a flow diagram illustrating one example of a method for recommending analytic tasks based on similarity of datasets. In some examples, such an example method may be implemented by a system such as, for example, system 100 of FIG. 1.

At 300, an incoming dataset may be received via a processing system. In some examples, the process at 300 may be implemented by the data processor 104 of system 100 described with reference to FIG. 1.

At 302, a feature vector for the incoming dataset may be generated. In some examples, the process at 302 may be implemented by the data processor 104 of system 100 described with reference to FIG. 1.

At 304, representative feature vectors may be identified for a plurality of datasets in a data repository. In some examples, the process at 304 may be implemented by the matching module 106 of system 100 described with reference to FIG. 1.

At 306, at least one cluster of datasets of the plurality of datasets may be selected based on similarity measures between the generated feature vector and the representative feature vectors. In some examples, the process at 306 may be implemented by the matching module 106 of system 100 described with reference to FIG. 1.

At 308, at least one dataset from the selected at least one duster may be selected based on similarity measures between the generated feature vector and the representative feature vectors of datasets in the selected at least one cluster. In some examples, the process at 308 may be implemented by the matching module 106 of system 100 described with reference to FIG. 1.

At 310, at least one analytic task associated with the selected dataset may be identified. In some examples, the process at 310 may be implemented by the recommendation module 110 of system 100 described with reference to FIG. 1.

At 312, the at least one analytic task may be recommended to be performed on the incoming dataset. In some examples, the process at 312 may be implemented by the recommendation module 110 of system 100 described with reference to FIG. 1.

In some examples, the at least one analytic task may include at least one of a machine learning algorithm and an analytics algorithm.

In some examples, identifying the at least one analytic task may be based on log information.

In some examples, the method may further include generating the clusters of datasets of the plurality of datasets based on similarity measures, and wherein the similarity measures are based on a comparison of at least one of data type, data size, data distribution, data attributes, topic, content, and application domain.

Examples of the disclosure provide a generalized system for recommending analytic tasks based on similarity of datasets. The generalized system automatically recommends an analytics task and/or machine learning algorithm to be performed on an incoming dataset, based on a similarity between the incoming dataset and an existing dataset that was amenable to such an analytic task and/or machine learning algorithm in the past. The similarity measures compare a wide range of features of the data. Also, a course-grained matching identifies a cluster of similar datasets, while a fine-grained matching identifies a dataset from the cluster of similar datasets.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a data processor to:
partition a plurality of datasets in a data repository, wherein the plurality of datasets are partitioned based on at least one of: a data type, a data size, a data distribution, data attributes, a topic, content, and an application domain,
receive an incoming dataset via a processing system,
generate a feature vector for the incoming dataset;
a matching module to:
select a first group of two or more representative feature vectors based on a data type of the incoming dataset, a data size of the incoming dataset, a data distribution of the incoming dataset, data attributes of the incoming dataset, a topic of the incoming dataset, content of the incoming dataset, and an application domain of the incoming dataset, wherein each representative feature vector is associated with a dataset of the plurality of datasets in the data repository;
select a second group of representative feature vectors by narrowing the first group of two or more representative feature vectors based on a data size of the incoming dataset and/or a data distribution of the incoming dataset,
determine similarity measures between the generated feature vector and each selected representative feature vector in the second group of representative feature vectors, wherein determining the similarity measures comprises a comparison of a number of overlaps between components of the generated feature vector and each selected representative feature vector in the second group of representative feature vectors, and
select at least one dataset of the plurality of datasets based on the similarity measures; and
a recommendation module to:
identify, based on a stored data structure comprising a plurality of associations between analytic tasks and datasets, at least one analytic task associated with the selected at least one dataset of the plurality of datasets, and
recommend, to a computing device via the processing system, the at least one analytic task to be performed on the incoming dataset.

2. The system of claim 1, wherein the recommended at least one analytic task includes at least one of a machine learning algorithm and an analytics algorithm.

3. The system of claim 1, wherein the stored data structure includes log information related to the analytic tasks that were previously performed on the plurality of datasets.

4. The system of claim 1, wherein the data processor clusters the plurality of datasets in the data repository based on the similarity measures.

5. The system of claim 4, wherein the matching module selects at least one cluster of datasets based on the similarity measures between the generated feature vector and representative feature vectors in the second group of representative feature vectors.

6. The system of claim 5, wherein the data processor applies at least one of text mining and natural language processing to extract properties of the plurality of datasets, and generates representative feature vectors based on the extracted properties of the plurality of datasets.

7. The system of claim 5, wherein the matching module selects at least one dataset from the selected at least one cluster of datasets based on the similarity measures between the generated feature vector and representative feature vectors of each dataset in the selected at least one cluster of datasets.

8. The system of claim 1, wherein the data processor generates the feature vector for the incoming dataset based on at least one of the topic of the incoming dataset, the data type of the incoming dataset, a number of column groups in the incoming dataset, a column group header, a column group data type, data characteristics, the data distribution of the incoming dataset, a number of rows in the incoming dataset, and a number of columns in the incoming dataset.

9. A method comprising:
partitioning a plurality of datasets in a data repository, wherein the plurality of datasets are partitioned based on at least one of: a number of attributes, a size, a data type, and an application domain;
receiving an incoming dataset via a processing system;
generating a feature vector for the incoming dataset;
identifying a first group of two or more representative feature vectors based on a number of attributes of the incoming dataset, a data type of the incoming dataset, and an application domain of the incoming dataset, wherein each representative feature vector is associated with a dataset of the plurality of datasets in the data repository;
selecting a second group of representative feature vectors by narrowing the first group of two or more representative feature vectors based on a data size of the incoming dataset and/or a data distribution of the incoming dataset;
determining similarity measures between the generated feature vector and each identified representative feature vector in the second group of representative feature vectors, wherein determining the similarity measures comprises a comparison of a number of overlaps between components of the generated feature vector and each identified representative feature vector in the second group of representative feature vectors;
selecting at least one dataset of the plurality of datasets based on the similarity measures;
identifying, based on a stored data structure comprising a plurality of associations between analytic tasks and datasets, at least two analytic tasks associated with the selected at least one dataset of the plurality of datasets; and
recommending, to a computing device via the processing system, at least one of the at least two analytics tasks to be performed on the incoming dataset, wherein if the at least one of the at least two analytic tasks is rejected, another analytic task of the at least two analytic tasks is recommended.

10. The method of claim 9, wherein the recommended at least one of the at least two analytics tasks includes at least one of a machine learning algorithm and an analytics algorithm.

11. The method of claim 9, wherein the stored data structure includes log information related to the analytic tasks that were previously performed on the plurality of datasets.

12. The method of claim 9, further comprising generating clusters of datasets of the plurality of datasets based on the similarity measures.

13. A non-transitory computer readable medium comprising executable instructions to:
partition a plurality of datasets in a data repository, wherein the plurality of datasets are partitioned based on at least one of: a data type, a data size, a data distribution, data attributes, a topic, content, and an application domain;
receive an incoming dataset via a processor;
generate a feature vector for the incoming dataset;
identify, via the processor, a first group of two or more representative feature vectors based on at least one of: a data type of the incoming dataset, data attributes of the incoming dataset, a topic of the incoming dataset, content of the incoming dataset, and an application domain of the incoming dataset, wherein each representative feature vector is associated with a dataset of the plurality of datasets in the data repository;
select a second group of representative feature vectors by narrowing the first group of two or more representative feature vectors based on a data size of the incoming dataset and/or a data distribution of the incoming dataset;
determine, via the processor, similarity measures between the generated feature vector and each selected representative feature vector in the second group of representative feature vectors, wherein determining the similarity measures comprises a comparison of a number of overlaps between components of the generated feature vector and each selected representative feature vector in the second group of representative feature vectors;
select at least one dataset of the plurality of datasets based on the similarity measures;
identify via the processor, based on a stored data structure comprising a plurality of associations between analytic tasks and datasets, at least one analytic task associated with the selected at least one dataset of the plurality of datasets, wherein the at least one analytic task includes one of a machine learning algorithm and an analytics algorithm; and
recommend, to a computing device via the processor, the at least one analytic task to be performed on the incoming dataset.

14. The computer readable medium of claim 13, wherein the stored data structure includes log information related to the analytic tasks that were previously performed on the plurality of datasets.

15. The computer readable medium of claim 13, comprising executable instructions to apply at least one of text mining and natural language processing to determine the representative feature vectors for the plurality of datasets.

16. The method of claim 9, including:
applying at least one of text mining and natural language processing to determine the representative feature vectors for the plurality of datasets.

17. The system of claim 1, wherein the data processor processes metadata related to the incoming dataset, and generates the feature vector for the incoming dataset based on the metadata related to the incoming dataset.

18. The method of claim 9, further comprising:
processing metadata related to the incoming dataset; and
generating the feature vector for the incoming dataset based on the processed metadata related to the incoming dataset.

19. The computer readable medium of claim 13, comprising executable instructions to:
process metadata related to the incoming dataset; and
generate the feature vector for the incoming dataset based on metadata related to the incoming dataset.

20. The system of claim 1, wherein the data processor performs pre-processing on the incoming dataset to group similar columns and reduce clutter.

* * * * *